US010812252B2

(12) United States Patent
Laine et al.

(10) Patent No.: US 10,812,252 B2
(45) Date of Patent: Oct. 20, 2020

(54) STRING MATCHING IN ENCRYPTED DATA

(71) Applicant: Microsoft Technology Licensing, LLC, Redmond, WA (US)

(72) Inventors: Kim Henry Martin Laine, Seattle, WA (US); Hao Chen, Seattle, WA (US); Gizem S. Cetin, Worcester, MA (US); Yuhou Xia, Princeton, NJ (US); Peter B. Rindal, Corvallis, OR (US); Kristin Estella Lauter, Redmond, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 180 days.

(21) Appl. No.: 15/630,761

(22) Filed: Jun. 22, 2017

(65) Prior Publication Data

US 2018/0198601 A1  Jul. 12, 2018

Related U.S. Application Data

(60) Provisional application No. 62/444,355, filed on Jan. 9, 2017.

(51) Int. Cl.
*G06F 21/00* (2013.01)
*H04L 9/00* (2006.01)
(Continued)

(52) U.S. Cl.
CPC .......... *H04L 9/008* (2013.01); *G06F 9/30014* (2013.01); *H04L 9/3239* (2013.01);
(Continued)

(58) Field of Classification Search
CPC ..... H04L 9/008; H04L 9/3239; H04L 9/0643; G06F 9/30014; G06F 16/245; H03M 13/6516
(Continued)

(56) References Cited

U.S. PATENT DOCUMENTS 6,772,339 B1 * 8/2004 Jakobsson ............. H04L 9/0841
380/283
8,429,421 B2   4/2013 Chase et al.
(Continued)

FOREIGN PATENT DOCUMENTS

EP   2924911 A1   9/2015

OTHER PUBLICATIONS

Beck, et al., "Approximate Two-Party Privacy-Preserving String Matching with Linear Complexity", In Proceedings of IEEE International Congress on Big Data, BigData Congress, Jun. 27, 2013, 14 pages.
(Continued)

*Primary Examiner* — Shewaye Gelagay
*Assistant Examiner* — Kevin Ayala
(74) *Attorney, Agent, or Firm* — Alleman Hall Creasman & Tuttle LLP

(57) ABSTRACT

In aspects of string matching in encrypted data, a computing device stores homomorphic encrypted data as a dataset, and implements a string matching application that receives an encrypted query string as a query of the homomorphic encrypted data. The string matching application can then apply algorithms to perform addition and multiplication operations, and determine whether there are matching strings of the encrypted query string in the dataset. The string matching application can compute, for each row of the dataset, a sum of some function of dataset bits and query bits for a row result, and multiply the row results of the computed rows to determine matching strings. Alternatively, the string matching application can compute, for each row of the dataset, a product over some function of the dataset bits and the query bits for a row result, and add the row results of the computed rows to determine matching strings.

15 Claims, 6 Drawing Sheets

(51) Int. Cl.
*G06F 9/30* (2018.01)
*H04L 9/32* (2006.01)
*H03M 13/00* (2006.01)
*H04L 9/06* (2006.01)
*G06F 16/245* (2019.01)

(52) U.S. Cl.
CPC ....... *G06F 16/245* (2019.01); *H03M 13/6516* (2013.01); *H04L 9/0643* (2013.01)

(58) Field of Classification Search
USPC .......................................................... 380/28
See application file for complete search history.

(56) References Cited

U.S. PATENT DOCUMENTS

| | | | |
|---|---|---|---|
| 8,515,058 | B1 | 8/2013 | Gentry |
| 8,903,083 | B2 | 12/2014 | Gentry et al. |
| 9,202,079 | B2 | 12/2015 | Kaliski, Jr. |
| 9,436,835 | B1 | 9/2016 | Saldamli |
| 10,075,288 | B1 | 9/2018 | Khedr et al. |
| 10,116,437 | B1 | 10/2018 | Krendelev |
| 2002/0027986 | A1 | 3/2002 | Brekne |
| 2004/0078414 | A1 | 4/2004 | Geiringer et al. |
| 2007/0116283 | A1 | 5/2007 | Tuyls et al. |
| 2008/0294909 | A1* | 11/2008 | Ostrovsky ......... G06F 16/24568 713/189 |
| 2009/0327748 | A1 | 12/2009 | Agrawal et al. |
| 2010/0020965 | A1 | 1/2010 | Gueron et al. |
| 2011/0110525 | A1 | 5/2011 | Gentry |
| 2012/0039463 | A1* | 2/2012 | Gentry .................... H04L 9/008 380/28 |
| 2012/0039473 | A1 | 2/2012 | Gentry et al. |
| 2013/0014270 | A1 | 1/2013 | Sy et al. |
| 2013/0024653 | A1 | 1/2013 | Gove |
| 2013/0170640 | A1* | 7/2013 | Gentry .................... H04L 9/008 380/30 |
| 2013/0216044 | A1* | 8/2013 | Gentry .................... H04L 9/008 380/277 |
| 2013/0329883 | A1 | 12/2013 | Tamayo-rios |
| 2014/0177828 | A1 | 6/2014 | Loftus |
| 2014/0215222 | A1 | 7/2014 | Sakumoto et al. |
| 2014/0233727 | A1 | 8/2014 | Rohloff et al. |
| 2014/0325230 | A1 | 10/2014 | Sy et al. |
| 2015/0033018 | A1 | 1/2015 | Tateishi et al. |
| 2015/0039912 | A1 | 2/2015 | Payton et al. |
| 2015/0046450 | A1 | 2/2015 | Yoshino et al. |
| 2015/0046708 | A1* | 2/2015 | Yasuda ................... H04L 9/008 713/168 |
| 2015/0280914 | A1* | 10/2015 | Yasuda ..................... H04L 9/14 380/30 |
| 2015/0288665 | A1* | 10/2015 | El Emam ................ G06F 16/86 713/171 |
| 2015/0295716 | A1 | 10/2015 | Liu |
| 2015/0312031 | A1 | 10/2015 | Seo et al. |
| 2015/0358153 | A1 | 12/2015 | Gentry |
| 2015/0365229 | A1 | 12/2015 | Patey et al. |
| 2016/0105402 | A1 | 4/2016 | Soon-shiong et al. |
| 2016/0119119 | A1* | 4/2016 | Calapodescu ............. H04L 9/30 380/30 |
| 2016/0191233 | A1 | 6/2016 | Loftus |
| 2017/0134157 | A1 | 5/2017 | Laine et al. |
| 2017/0134158 | A1* | 5/2017 | Pasol ...................... H04L 9/008 |
| 2017/0293913 | A1 | 10/2017 | Gulak et al. |
| 2018/0011996 | A1* | 1/2018 | Dolev ..................... H04L 9/085 |
| 2018/0375639 | A1 | 12/2018 | Lauter et al. |
| 2018/0375640 | A1 | 12/2018 | Laine et al. |
| 2019/0007197 | A1 | 1/2019 | Laine et al. |
| 2019/0220734 | A1 | 7/2019 | Ferdman et al. |

OTHER PUBLICATIONS

Jaschke, et al., "Accelerating Homomorphic Computations on Rational Numbers", In Proceedings of International Conference on Applied Cryptography and Network Security, Jun. 19, 2016, 19 Pages.

Chase, et al., "Substring-Searchable Symmetric Encryption", In Proceedings on Privacy Enhancing Technologies, Jun. 18, 2015, 28 Pages.

Chen, et al., "Cocoon: Encrypted Substring Search", Retrieved From: https://pdfs.semanticscholar.org/ae2b/b2dd98ce5db50703005e3c6c7b43045621ca.pdf, May 11, 2016, 14 Pages.

Chen, et al., "Simple Encrypted Arithmetic Library—Seal v2.1", In Proceedings of International Conference on Financial Cryptography and Data Security, Nov. 19, 2017, 27 Pages.

Chung, et al., "Encoding Rational Numbers for FHE-based Applications", In Proceedings for International Association for Cryptologic Research, Mar. 30, 2016, 19 Pages.

Dowlin, et al., "Manual for Using Homomorphic Encryption for Bioinformatics", In Proceedings of the IEEE vol. 105, Issue 3, Mar. 2017, 18 Pages.

Fan, et al., "Somewhat Practical Fully Homomorphic Encryption", In Journal of IACR Cryptology ePrint Archive, Mar. 2012, 19 Pages.

Fouque, et al., "CryptoComputing with Rationals", In Proceedings of International Conference on Financial Cryptography, Mar. 11, 2002, 11 Pages.

Laine, Kim, "String Matching on Homomorphically Encrypted Data", Retrieved From: http://kimlaine.org/talks/IISc2017.pdf, Retrieved Date: Mar. 27, 2017, 28 Pages.

Lepoint, et al., "A Comparison of the Homomorphic Encryption Schemes FV and YASHE", In Proceedings of 7th International Conference on Cryptology in Africa, May 28, 2014, 18 Pages.

"International Search Report and Written Opinion Issued in PCT Application No. PCT/US2018/039571", dated Oct. 9, 2018, 13 Pages.

"International Search Report and Written Opinion Issued in PCT Application No. PCT/US2018/039634", dated Oct. 8, 2018, 13 Pages.

Cetin,"Arithmetic Using Word-wise Homomorphic Encryption", https://eprint.iacr.org/2015/1195.pdf, Retrieved on: Oct. 21, 2016, 15 pages.

Lopez-Alt,"Cryptographic Algorithms for the Secure Delegation of Multiparty Computation", https://www.cs.nyu.edu/media/publications/AdrianaLopezalt.pdf, May 2014, 120 pages.

Ozturk,"Accelerating Somewhat Homomorphic Evaluation using FPGAs", In Journal of IACR Cryptology ePrint Archive, Retrieved on: Oct. 18, 2016, Mar. 28, 2015, 15 pages.

Stehle,"Faster Fully Homomorphic Encryption", In Proceedings of International Conference on the Theory and Application of Cryptology and Information Security, Dec. 5, 2010, 25 pages.

"Final Office Action Issued in U.S. Appl. No. 15/633,284", dated Apr. 25, 2019, 25 Pages.

"Final Office Action Issued in U.S. Appl. No. 15/638,181", dated Jun. 21, 2019, 24 Pages.

"Non Final Office Action Issued in U.S. Appl. No. 15/630,824", dated Jan. 7, 2019, 33 Pages.

"Non Final Office Action Issued in U.S. Appl. No. 15/633,284", dated Dec. 26, 2018, 23 Pages.

"Non Final Office Action Issued in U.S. Appl. No. 15/638,181", dated Dec. 27, 2018, 12 Pages.

Brakerski, et al., "Efficient Fully Homomorphic Encryption from (Standard) LWE", In the Proceedings of 52nd Annual Symposium on Foundations of Computer Science, Oct. 22, 2011, pp. 97-106.

Chen, et al., "Fully Homomorphic Encryption Application in Cloud Computing", In the Proceedings of 11th International Computer Conference on Wavelet Active Media Technology and Information Processing, Dec. 19, 2014, pp. 471-474.

Wang, Yongge, "Octonion Algebra and Noise-Free Fully Homomorphic Encryption (FHE) Schemes", In the Journal of IACR Cryptology ePrint Archive, Jan. 25, 2016, 39 Pages.

Yong, et al., "A Novel Fully Homomorphic Encryption Scheme Bsed on LWE", in the Journal of Natural Sciences, Wuhan University, vol. 21, Issue 1, Feb. 1, 2016, pp. 84-92.

(56) References Cited

OTHER PUBLICATIONS

Zhang, et al., "Efficient Fully Homomorphic Encryption From RLWE with an Extension to a Threshold Encryption Scheme", In the Journal of Future Generation Computer Systems, vol. 36, Jul. 1, 2014, pp. 180-186.
"Final Office Action Issued in U.S. Appl. No. 15/630,824", dated Jul. 18, 2019, 32 Pages.
"Non Final Office Action Issued in U.S. Appl. No. 15/630,824", dated May 20, 2020, 31 Pages.

* cited by examiner

STRING MATCHING IN ENCRYPTED DATA

RELATED APPLICATION

This application claims priority to U.S. Patent Provisional Application Ser. No. 62/444,355 filed Jan. 9, 2017 entitled "String Matching in Encrypted Data", the disclosure of which is incorporated by reference herein in its entirety.

BACKGROUND

Cloud-based storage and on-line services are readily available and continue to develop rapidly. Enterprise customers, such as in the medical and financial sectors, save money and streamline business processes by outsourcing the storage and computation of their data to public storage, such as provided by cloud-based services. Instead of storing and managing a large amount of data locally, a medical service provider, for example, can utilize cloud storage for electronic medical records of patient data, and a financial service provider can utilize the cloud storage for financial data and customer records. However, using public cloud-based storage can potentially expose data, compromising the privacy and security of the personal medical, financial, and other sensitive data.

One effective technique is to store private and sensitive data in an encrypted form in the public cloud-based storage, and perform computations on the encrypted data directly. However, typical block ciphers do not allow encrypted data to be used in encrypted form, and meaningful computation on the encrypted data would either require it to be returned to the owner of the data for decryption, or alternatively, for the cloud-based storage service to have access to the decryption key. Homomorphic encryption refers to encryption schemes used to encrypt data in a way that allows evaluating Boolean or arithmetic circuits on the encrypted data while it remains encrypted. Homomorphic encryption may also refer to encryption schemes with less capabilities, such as for performing only additions or only multiplications on the encrypted data. However, the conventional techniques used to evaluate homomorphic encrypted data are significantly less efficient than operating on unencrypted data, such as if the data is returned to the owner of the data for decryption.

SUMMARY

This Summary introduces features and concepts of string matching in encrypted data, which is further described below in the Detailed Description and/or shown in the Figures. This Summary should not be considered to describe essential features of the claimed subject matter, nor used to determine or limit the scope of the claimed subject matter.

String matching in encrypted data is described. In aspects, a computing device includes memory that stores homomorphic encrypted data as a dataset. A string matching application is implemented that can receive an encrypted query string as a query of the homomorphic encrypted data. The string matching application can then apply one or more algorithms to perform addition and multiplication operations, and determine whether there are matching strings of the encrypted query string in the dataset. The string matching application can compute, for each row of the dataset of the homomorphic encrypted data, a sum of some function of dataset bits and query bits for a row result, and then multiply the respective row results of the computed rows to determine the matching strings. Alternatively, the string matching application can compute, for each row of the dataset of the homomorphic encrypted data, a product over some function of the dataset bits and the query bits for a row result, and then add the respective row results of the computed rows to determine a total number of the matching strings.

In other aspects of string matching in encrypted data, the string matching application is implemented to represent the dataset bits and the query bits of an encrypted query string in an integer base larger than two (2). The string matching application is also implemented to apply a randomization algorithm effective to mask the homomorphic encrypted data that may otherwise be exposed by the computed sum and the multiply operations. Generally, the result of a homomorphic computation might reveal extra information about the dataset, beyond simply whether a match was found. Further, the string matching application can be implemented to simultaneously query the dataset of the homomorphic encrypted data for multiple encrypted query strings, and determine multiple matching strings of the multiple encrypted query strings in the dataset. The string matching application is also implemented to reduce a size of the encrypted query string prior to the addition and multiplication operations that provide the one or more matching strings of the encrypted query string in the dataset. The string matching application can also apply a hashing algorithm to organize the dataset strings into bins for comparing the encrypted query string prior to the addition and multiplication operations. The string matching application may also apply a Galois unpacking algorithm to initiate multiple encrypted query strings in a single ciphertext.

BRIEF DESCRIPTION OF THE DRAWINGS

Aspects of string matching in encrypted data are described with reference to the following Figures. The same numbers may be used throughout to reference like features and components that are shown in the Figures.

DETAILED DESCRIPTION

Aspects of string matching in encrypted data are described, such as to implement an "add-then-multiply" technique and a "multiply-then-add" technique. As noted above, techniques for evaluating homomorphic encrypted data are significantly less efficient than operating on unencrypted data, and the techniques for string matching in encrypted data described herein provide optimizations and efficiencies that increase the computer processing speed when evaluating the encrypted data. Homomorphic encryption is used to encrypt data in a way that allows evaluating Boolean or arithmetic circuits on the encrypted data while it remains encrypted. Notably, the techniques described herein for string matching in encrypted data provide the optimizations and efficiencies for evaluating encrypted data.

Generally, two techniques for evaluating homomorphic encrypted data are described, as well as additional efficiencies that may be implemented in aspects of string matching in encrypted data. The first technique referred to as "add-then-multiply" is generally suited for longer queries on smaller datasets, and the second technique referred to as "multiply-then-add" is generally suited for shorter queries on larger datasets. Additional efficiencies can be implemented to reduce the query size, namely using "permutation/cuckoo hashing" which also makes the process of multi-queries more efficient, as well as using a higher base in encoding the query and dataset strings. Additionally, a "Galois unpacking" technique can be implemented to reduce the query size.

While features and concepts of string matching in encrypted data can be implemented in any number of different devices, systems, networks, environments, and/or configurations, aspects of string matching in encrypted data are described in the context of the following example devices, systems, and methods.

Figure 1:
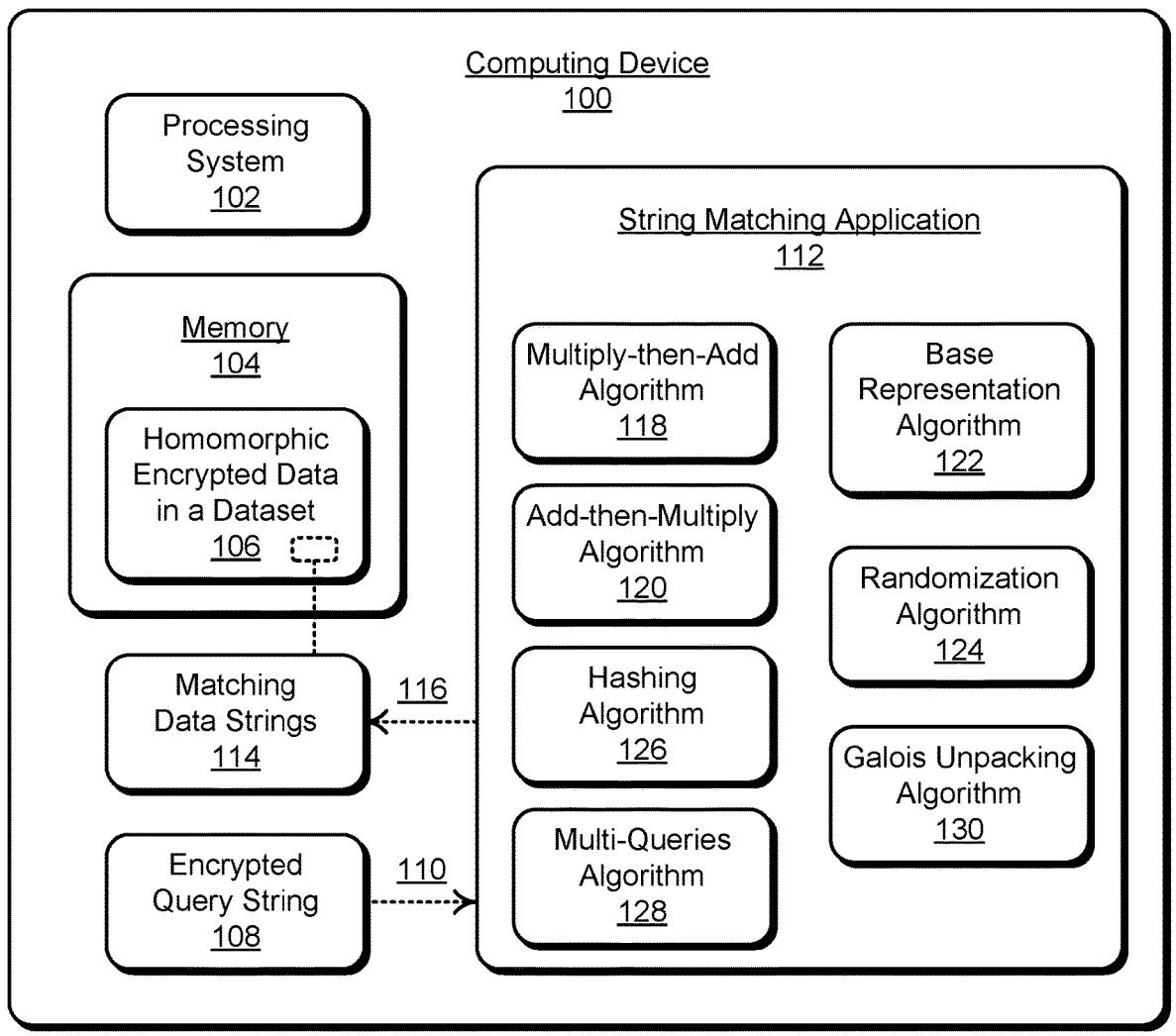
FIG. 1 illustrates an example computing device in which aspects of string matching in encrypted data can be implemented as described herein.

FIG. 1 illustrates an example computing device 100 in which aspects of string matching in encrypted data can be implemented. The computing device 100 can be implemented with various components, such as a processing system 102 and memory 104 (e.g., non-volatile, physical memory), and with any number and combination of different components as further described with reference to the example device shown in FIG. 6. In implementations, the processing system 102 may include multiple and/or different processors, such as a microprocessor, a separate graphics processor, and/or a separate high-speed, dedicated processor.

In this example, homomorphic encrypted data is stored in the memory 104 as a homomorphic encrypted data in a dataset 106. The homomorphic encrypted data in the dataset 106 can include N (bit) strings of some length L, all of which are encrypted using homomorphic encryption to encrypt one bit of the data at a time. The encrypted bits in the dataset 106 can be denoted as $R_{\{1,1\}}$, $R_{\{N,L\}}$, in rows and columns of the encrypted bits. For simplicity, an encrypted bit string Q of the length L is the encrypted query string 108 that is an input 110 to a string matching application 112, which can determine whether there are matching entries in the homomorphic encrypted dataset 106 of the encrypted data. The encryptions of the bits in the encrypted bit string Q as the encrypted query string 108 can be denoted as $Q_1, \ldots Q_L$.

The computing device 100 implements the string matching application 112 that can include various algorithms to implement the techniques of string matching in encrypted data, as described herein. The application and algorithms can be implemented as software applications or modules, such as computer-executable software instructions that are executable with the processing system 102. The string matching application 112 can be stored in computer-readable storage memory (e.g., the memory 104), such as any suitable memory device or electronic data storage implemented in the computing device. Further, although the various algorithms are shown and described as modules of the string matching application 112, any one or combination of the algorithms may be implemented separately or together, and may be independent of the string matching application. An overview of the string matching application 112 and the various algorithms is described following, with additional implementation details described with reference to FIG. 2.

In aspects of string matching in encrypted data, the string matching application 112 can receive the encrypted query string 108 as a query of the homomorphic encrypted dataset 106. The string matching application 112 can then apply one or more of the various algorithms to perform addition and multiplication operations, and determine whether there are matching data strings 114 of the encrypted query string in the dataset 106, where the matching data strings 114 are an output 116 of the string matching application. In an implementation, a multiply-then-add algorithm 118 of the string matching application 112 is implemented to compute, for each row of the dataset 106, a product over some function of dataset bits and query bits for a row result, such as denoted by $1-(query_{bit}-dataset_{bit})^2$. The multiply-then-add algorithm 118 then adds the respective row results of the computed rows to determine a total number of the matching data strings 114. In another implementation, an add-then-multiply algorithm 120 of the string matching application 112 is implemented to compute, for each row of the dataset 106, a sum of some function of dataset bits and query bits for a row result. The add-then-multiply algorithm 120 then multiplies the respective row results of the computed rows to determine the matching data strings 114.

The described technique for "multiply-then-add" can be implemented by the multiply-then-add algorithm 118 (or module) of the string matching application 112. The multiply-then-add algorithm 118 is implemented to first compute, for each row j of the dataset 106, a $\text{product}_{\{i=1 \ldots L\}} (1-(Q_i-R_{\{j,i\}})^2)$. This result will be a one (1) when the encrypted query string 108 precisely matches the j-th row (e.g., is a matching data string 114 in the homomorphic encrypted data in the dataset 106), otherwise the result will be a zero (0). After performing this product operation on each row j of the dataset, the multiply-then-add algorithm 118 adds the product results for each of the rows to obtain the total number of matching data strings 114 in the homomorphic encrypted data in the dataset 106.

The described technique for "add-then-multiply" can be implemented by the add-then-multiply algorithm 120 (or module) of the string matching application 112. The add-then-multiply algorithm 120 is implemented to first compute, for each row j of the dataset, a $\text{sum}_{\{i=1 \ldots L\}} (Q_i-R_{\{j,i\}})^2$. This result will be a zero (0) when the encrypted query string 108 precisely matches the j-th row (e.g., is a matching data string 114 in the homomorphic encrypted dataset 106). After performing this addition operation on each row j of the dataset 106, the add-then-multiply algorithm 120 multiplies together the addition results for each of the rows, which will reveal whether there is a matching data string 114 or not in the homomorphic encrypted data in the dataset 106. This add-then-multiply technique may give a lower bound on the number of matching strings, however for longer encrypted query strings 108, this is more efficient to implement for querying homomorphic encrypted data.

An efficiency that can be implemented by the add-then-multiply algorithm 120 is to compare larger numbers than simply single bits of the dataset 106 and the query bits in the encrypted query string 108. A base representation algorithm 122 of the string matching application 112 is implemented and can be utilized to represent the query bits of the encrypted query string 108 and the dataset bits of the homomorphic encrypted data in the dataset 106 as integers in some larger base, such as the dataset bits and the query bits represented in an integer base larger than two (2). A larger base improves the query size of the encrypted query string 108.

In some instances, namely if performed naively, the add-then-multiply algorithm 120 may disclose information of the homomorphic encrypted data other than just the query response output 116, such as information that a data owner might not want disclosed. A randomization algorithm 124 of the string matching application 112 implements an efficient randomization technique that masks the extra information in a cryptographically secure way. The randomization algorithm 124 can be applied effective to mask the homomorphic encrypted data in the dataset 106 that may otherwise be exposed by the addition and multiplication operations of the add-then-multiply algorithm 120. The results of the add-then-multiply method gives a zero (0) if a match was found, and some non-zero value if there was no match. However, this non-zero value can reveal information about the dataset 106, and the randomization technique can be utilized to randomize it by multiplying by a random non-zero number (modulo some integer t). This randomization keeps the zero (0) a zero (0), and hides all information leak from non-zero results. As described below, a batching technique may also be used for randomization of thousands of such comparison results simultaneously.

In implementations, a hashing algorithm 126 of the string matching application 112 can be applied prior to the addition and multiplication operations of the add-then-multiply algorithm 120. The hashing algorithm 126 of the string matching application 112 can be utilized to implement permutation hashing, together with cuckoo hashing, to significantly improve aspects of the described techniques for string matching in encrypted data. This efficiency encodes a part of the encrypted query string 108 into the hash table bin label (referring to the property of permutation-based hashing). The hashing organizes the strings in the dataset 106 into bins, avoiding the need to compare a query string individually to every single string in the dataset, but instead compare only to the strings in a particular bin. This permutation hashing technique as implemented by the hashing algorithm 126 can be used both with the add-then-multiply technique and the multiply-then-add technique.

The hashing technique also enables efficient multi-queries, as implemented by a multi-queries algorithm 128. The string matching application 112 can simultaneously query the dataset 106 of the homomorphic encrypted data for multiple encrypted query strings 108, and determine multiple matching data strings 114 of the multiple encrypted query strings in the dataset. This efficiency can be implemented by the multi-queries algorithm 128 to simultaneously query the homomorphic encrypted data in the dataset 106 for several entries by the same client.

Additionally, a Galois unpacking algorithm 130 of the string matching application 112 can be implemented and utilized for Galois unpacking, which is used to pack a large number of the queries (e.g., the encrypted query strings 108) into just one ciphertext that is sent to a server device (which may store and implement an instantiation of the string matching application). This technique can be implemented for both of the "add-then-multiply" and "multiply-then-add" techniques, as further described with reference to FIG. 2. In implementations, Galois unpacking can be used to reduce the size of the first communication (e.g., an encrypted query to a cloud-based service), since most of the query data will be in some sense empty. The string matching protocol relies on the query values being placed in correct batching "slots", but for only a few queries, it might be that there are thousands of slots and only a few that are occupied by query data. The implementation is to use more of the slots and write query data to "wrong" (empty) slots. The cloud-based service can then extract the data from those wrong slots and put it in the right place. This can be done in a systematic way, such as by permuting the contents of the slots, and filtering out the contents of given slots (e.g., setting other slots to zero (0), and preserving the values in given slots).

Figure 2:
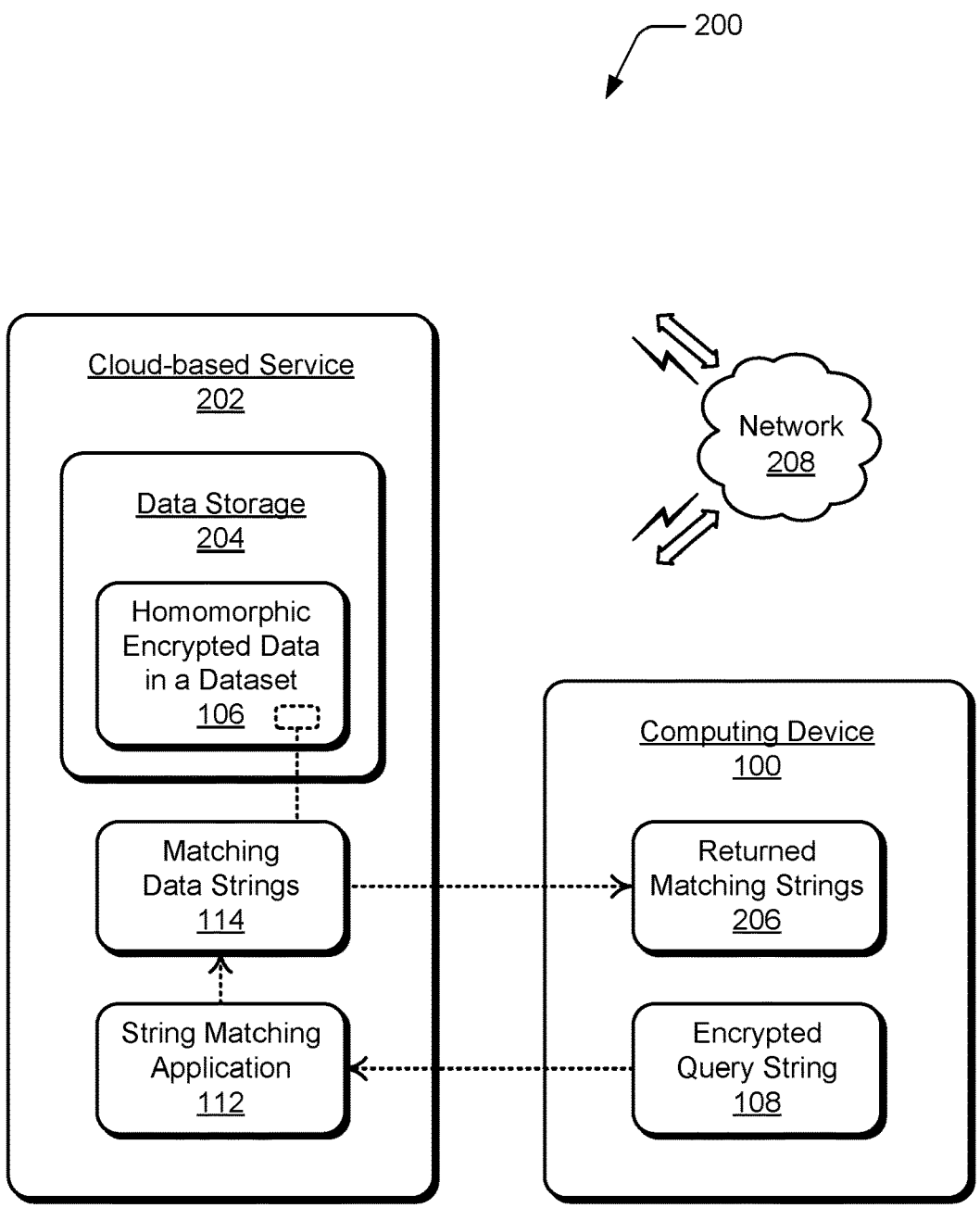
FIG. 2 illustrates an example system in which aspects of string matching in encrypted data can be implemented as described herein.

FIG. 2 illustrates an example system 200 in which aspects of string matching in encrypted data can be implemented as described herein. The example system 200 includes the computing device 100 that is shown and described with reference to FIG. 1. The example system also includes a cloud-based service 202 that is accessible by computing devices, to include the computing device 100. The cloud-based service 202 includes data storage 204 that may be implemented as any suitable memory, memory device, or electronic data storage for network-based storage. The data storage 204 can store the homomorphic encrypted dataset 106. The cloud-based service 202 can also implement an instance of the string matching application 112, as shown and described with reference to FIG. 1.

In this instance, the string matching application 112 can receive an encrypted query string 108 from the computing device 100 as a query of the homomorphic encrypted data in the dataset 106. The string matching application 112 can then apply one or more of the various algorithms shown and described with reference to FIG. 1 to perform the addition and multiplication operations, as well as the described efficiencies and techniques, to determine the matching data strings 114 of the encrypted query string 108 in the dataset 106. The matching data strings 114 can then be returned to the computing device 100 as the returned matching strings 206, which are encrypted. The computing device 100 can decrypt the returned matching strings 206 and determine the matches from the decryption.

The cloud-based service 202 can also be implemented with server devices that are representative of one or multiple hardware server devices of the service. Further, the cloud-based service 202 can be implemented with various components, such as a processing system and memory, as well as with any number and combination of different components as further described with reference to the example device shown in FIG. 6 to implement the services, applications, servers, and other features of string matching in encrypted data. Other aspects of string matching in encrypted data as described herein can be implemented by the string matching application 112 at the cloud-base service and/or may be implemented in conjunction with the string matching application 112 that is implemented by the computing device 100, as shown and described with reference to FIG. 1.

The example system 200 also includes a network 208, and any of the devices, servers, and/or services described herein can communicate via the network, such as for data communication between the computing device 100 and the cloud-based service 202. The network 208 can be implemented to include a wired and/or a wireless network. The network can also be implemented using any type of network topology and/or communication protocol, and can be represented or otherwise implemented as a combination of two or more networks, to include IP-based networks and/or the Internet. The network may also include mobile operator networks that are managed by a mobile network operator and/or other network operators, such as a communication service provider, mobile phone provider, and/or Internet service provider.

Homomorphic encryption is a powerful cryptographic technique that allows computation on encrypted data without first decrypting it, and an often used or initiated task is searching an encrypted dataset for a particular encrypted query string. Even though anyone can operate on the encrypted data, the results of the operations remain encrypted, and no information about the underlying plaintext is leaked, except perhaps its size. In examples related to string matching, a medical service provider may want to outsource the storage of encrypted medical data files for public cloud-based storage, such as at the cloud-based service 202 with the data storage 204. Similarly, a financial service provider may want to outsource the storage of encrypted financial data files for public cloud-based storage.

In order to protect the privacy of the patients of the medical service provider, and protect the privacy of the customers of the financial service provider, the respective medical data files and the financial data files are uploaded to the cloud-based service 202 for storage in encrypted form, such as the homomorphic encrypted data in the dataset 106. At a later date, the medical service provider or the financial service provider may want to query and/or update the encrypted data that has been uploaded to the cloud-based storage. The computing device 100 is representative of an entity accessing or initiating a query of the homomorphic encrypted data that has been stored as the dataset 106 in the data storage 204 at the cloud-based service 202. A text matching query or data update can be communicated from the medical service provider or the financial service provider in an encrypted form to protect the privacy of the respective patients and customers. In this instance, the cloud-based storage system can initiate string matching on the homomorphically encrypted data, such as implemented by the string matching application 112 at the cloud-based service 202.

In a basic form, and to facilitate ease of discussion, an example of string matching on homomorphically encrypted data can be summarized as a data string Q of length l that has been homomorphically encrypted. A task can be initiated to perform a comparison operation that returns a ciphertext whose decryption reveals whether the data string Q and another data string X of the same length l are a matching data string (e.g., the same data string). The decryption may or may not leak information about one or both of the data strings Q, X. As a more complicated example, a dataset may include N-homomorphically encrypted strings $Q_1, \ldots, Q_N$, all of length l. A task may be initiated to query the entire dataset, and to return a ciphertext whose decryption reveals whether a given query string X is present in the dataset. Again, the decryption may or may not reveal information about one or more of the strings $Q_i$, X. In more complicated examples, an entity may want to accept partial matches, or encrypted strings within a certain Hamming distance of the query string.

Generally, the techniques and algorithms of string matching in encrypted data as described herein are agnostic to the encryption scheme that is being used for homomorphic encryption. However for simplicity, the discussion centers on Ring-LWE (learning with error)-based cryptosystems using power-of-2 cyclotomic rings of integers. This is described in a document "On ideal lattices and learning with errors over rings" by Lyubashevsky et al. (Advances in Cryptology—EUROCRYPT 2010, $29^{th}$ Annual International Conference on the Theory and Applications of Cryptographic Techniques, French Riviera, May 30-Jun. 3, 2010. Proceedings, volume 6110 of Lecture Notes in Computer Science, pages 1-23. Springer, 2010). In such cryptosystems, the plaintext space is typically the polynomial quotient ring $Z_t[x]/(x^n+1)$, and the ciphertext space is the polynomial quotient ring $Z_q[x]/(x^n+1)$, where n is a power of 2, and t<<q are integers. Here $Z_t$ and $Z_q$ denote integers modulo t and q, respectively. Thus, it is customary to denote $R=Z[x]/(x^n+1)$, so that the plaintext and ciphertext spaces become $R_t=R/tR$, and $R_q=R/qR$, respectively. In implementations, the techniques described herein can utilize the Simple Encrypted Arithmetic Library (SEAL version of the library v2.1), which implements the Fan-Vercauteren scheme. Thus, the techniques also may apply trivially to many other encryption schemes that are used for homomorphic encryption.

As a distinction, fully homomorphic encryption refers to an encryption scheme which can evaluate any arithmetic circuit on encrypted inputs, but in practice, is extensive to implement. Rather, by restricting the multiplicative depth of the circuits to some bound L, the parameters of the encryption scheme can be set to support only circuits up to depth L, and significantly better performance is obtained with this "leveled fully" homomorphic encryption scheme, rather than the result of using a true fully homomorphic encryption scheme. The leveled fully homomorphic encryption scheme can be described by randomized algorithms, which include Setup, KeyGen, Encrypt, Decrypt, and Evaluate algorithms.

Given a security parameter K and a parameter $L \in Z^+$ (level), the Setup($1^K$, $1^L$) outputs a set of encryption parameters parms. The KeyGen(parms) outputs a secret key sk and a public key pk, and optionally, outputs one or more evaluation keys evk. Given a message $m \in R_t$, the Encrypt(m, pk) outputs ciphertext $c \in R_q$. Given the ciphertext $c \in R_q$, the Decrypt(c, sk) outputs a message $m \in R_t$. For the Evaluate(C, (c1, ..., $c_k$), evk): Given a circuit f of depth at most L with k input wires, and inputs c1, ..., $c_k$, with $c_i \rightarrow$Encrypt($m_i$, pk), outputs a ciphertext c such that Pr [Decrypt(c, sk)≠f ($m_1, \ldots, m_k$)]=negl(κ). Additionally, the size of the output of Evaluate is not more than a polynomial in κ independent of f (compactness), and independent of L. The leveled fully homomorphic encryption scheme is secure if it is IND-CPA secure.

With reference to encoding, the techniques described herein restrict to encryption schemes for homomorphic encryption where the plaintext space is the polynomial quotient ring $R_t$. Thus, when integers are to be encrypted, and integer arithmetic performed on them in encrypted form, an encoding scheme is used to convert integers into elements of $R_t$. There are many ways to do this, however the simplest and easiest method can be utilized for string matching in encrypted data. Given an integer $m \in Z$, it is encoded as the constant polynomial $m \in R_t$, allowing for only encoding integers between zero (0) and t−1, which provides a strict lower bound on the size of t that can be used. Because $Z_t$ is a subring of $R_t$, as long as the coefficients of the underlying plaintext polynomials that are encountered during the homomorphic evaluation never get reduced modulo t, the homomorphic encryption scheme can be used to perform integer arithmetic. This can place a strong lower bound on the size of t, which subsequently necessitates the use of larger n and q, meaning that t should be chosen to be as small as possible.

With reference to batching, this technique allows SIMD (Single Instruction, Multiple Data) operations to be performed on homomorphically encrypted data. The batching technique allows for a method of packing several plaintext integers into one plaintext polynomial in a way that allows sums and products to be evaluated on the individual integers in encrypted form, all at the cost of only one homomorphic operation. Generally, a homomorphic encoding scheme can be extremely wasteful, as it encodes only one single integer modulo t into a plaintext polynomial with enough space to store thousands of such integers. As noted above, ring $R=Z[x]/(x^n+1)$ is used to construct both the plaintext space ($R_t$) and the ciphertext space ($R_q$), and n is always a power of two (2). A naive way to improve is by enabling SIMD operations to encode one integer modulo t into each coefficient of the message polynomial. While such an encoding would work when the additive homomorphism is used (the addition of polynomials in $R_t$ is done coefficient-wise), it would not work for multiplications.

Instead, the standard approach is to choose t such that the polynomial modulus $x^n+1$ factors into n linear factors modulo t. This is achieved by restricting t to be a prime such that $2n|(t-1)$. This results in the plaintext space $R_t$ to split into a direct product as $R_t \simeq Z_t^n$, where the isomorphism is an isomorphism of rings, meaning it respects both additions and multiplications. Given a vector $m \in Z_t^n$ representing the values in the individual slots, its composition is denoted into a plaintext polynomial $m \in R_t$ by Compose(m). Similarly, given a plaintext polynomial $m \in R_t$, its decomposition is denoted into a vector $m \in Z_t^n$ representing the values in the individual slots by Decompose(m). In computations where SIMD operations can be used, batching can provide a significant improvement in latency, and in other cases at least in throughput.

String Matching

With reference to the dataset 106 of the homomorphic encrypted data, the dataset D is distinct N $\ell$-bit strings $Q^{(1)}, \ldots, Q^{(N)}$. The encrypted data bits are denoted in $Q^{(i)}$ by $Q_1^{(i)}, \ldots, Q_\ell^{(i)}$, so that the dataset can be organized into an N×$\ell$ matrix of bits:

$$D = \begin{pmatrix} Q_1^{(1)} & \cdots & Q_\ell^{(1)} \\ \vdots & \ddots & \vdots \\ Q_1^{(N)} & \cdots & Q_\ell^{(N)} \end{pmatrix}$$

The dataset D can be homomorphically encrypted to produce an encrypted dataset $D_{Enc}$, and given an $\ell$-bit query string X, the data bits are denote by $X_1, \ldots, X_\ell$, and can be homomorphically encrypted to yield an encrypted query $X_{Enc}$. The task is then to construct a low-depth arithmetic circuit $f_{Query}$, such that the result of the homomorphic evaluation $f_{Query}(D_{Enc}, X_{Enc})$ decrypts and decodes correctly to yield a plaintext from which it can be determined whether the query string X matches any of the rows of the dataset D.

Homomorphic encryption can be used together with batching as described above to encrypt the dataset D. With n as a power of two, and t is a prime such that $2n|(t-1)$. Every plaintext polynomial in $R_t$ can now be considered as an n-tuple of slots, each containing an integer modulo t. If n∤N, empty rows can be added to extend the dataset to satisfy n|N Thus, without loss of generality, assume n|N, and B=N/n is the batch count. A B×$\ell$ matrix $\overline{D}$ of plaintext polynomials is formed:

$$\overline{D} = \begin{pmatrix} \text{Compose}\begin{bmatrix} Q_1^{(1)} \\ \vdots \\ Q_1^{(n)} \end{bmatrix} & \cdots & \text{Compose}\begin{bmatrix} Q_\ell^{(1)} \\ \vdots \\ Q_\ell^{(n)} \end{bmatrix} \\ \vdots & \ddots & \vdots \\ \text{Compose}\begin{bmatrix} Q_1^{(N-n+1)} \\ \vdots \\ Q_1^{(N)} \end{bmatrix} & \cdots & \text{Compose}\begin{bmatrix} Q_\ell^{(N-n+1)} \\ \vdots \\ Q_\ell^{(n)} \end{bmatrix} \end{pmatrix}$$

which is encrypted entry-wise to form an encrypted matrix $\overline{D}_{Enc}$ whose i-th row $\overline{D}_{Enc}$ is a vector of length $\ell$ of ciphertext polynomials.

Given a query string X with bits $X_1, \ldots, X_\ell$, an $\ell$-dimensional vector of plaintext polynomials is first formed as:

$$\overline{x} = \left( \text{Compose}\begin{bmatrix} X_1 \\ \vdots \\ X_1 \end{bmatrix} \ldots \text{Compose}\begin{bmatrix} X_\ell \\ \vdots \\ X_\ell \end{bmatrix} \right) = (X_1 \ldots X_\ell)$$

The second equality is due to the fact that Compose [a . . . a]$^T$ is equal to the constant polynomial $a \in R_t$, so the query string bits can be directly written as the plaintext polynomial coefficients (constant polynomials) to form the vector $\overline{X}$. Each of the polynomials in $\overline{X}$ can then be encrypted to form an encrypted query vector $\overline{X}_{Enc}$.

Add-then-Multiply

The string matching application 112 implements the add-then-multiply algorithm 120, also referred to herein as compare-add-multiply (CAM). This technique can be used for scenarios where the data strings are long, and there are few batches (large $\ell$, small B). The add-then-multiply algorithm 120 homomorphically evaluates the function noted as Equation (1):

$$CAM(\overline{D}_{Enc}, \overline{X}_{Enc}) = \prod_{i=1}^{B} \prod_{j=1}^{\ell} \left( (\overline{D}_{Enc}^{(i)})_j - (\overline{X}_{Enc})_j \right)^2$$

where $(-)_j$ denotes the j-th component in a vector.

Due to batching, in Equation (1) above, each subtraction followed by squaring compares n bits (one bit per one row in the original dataset D) to the corresponding bit position in the query string X Let i be the index of one of the B batches, and consider what happens in the sum for this particular i. If the k-th row within the i-th batch (i.e., the (n(i-1)+k)-th row in D) matches the query string X, then the sum will have value zero (0). Otherwise it will have a non-zero value of at most $\ell$. Finally, evaluating the product results in a ciphertext with a 0 in the k-th slot precisely when the query matched the (n(i-1)+k)-th row of D for at least one batch index i. Note that the parameter t in the encryption scheme is needed to be bigger than $\ell$ so as to avoid false positives from appearing as a result of the sum wrapping around t. Note also that t being large enough to support the multiplication over the batches is not a concern because t being prime ensures that the product is zero (0) (mod t) precisely when one of the factors is zero (0). Evaluating the function CAM requires (2$\ell$-1)B additions or subtractions, $\ell$B squarings, and B-1 multiplications. It has multiplicative depth $(1+\lceil\log_2 B\rceil)$, which is small when N is small, and does not depend on $\ell$. It should be noted that the CAM function can be evaluated with only a depth $\lceil\log_2 (B+1)\rceil$ circuit.

With reference to Larger Base, as implemented by the base representation algorithm 122 of the string matching application 112, if the strings to be compared are long, much of the running time of the function CAM will be spent performing the $\ell$B squarings. The processing time can be significantly improved by reducing the length $\ell$ of the rows of the dataset D by not representing them as strings of bits, but instead as strings of base-b digits, where b>2. The same kind of representation would then need to be used for the query string X The above described techniques still work with the implementation of the larger base, and in particular the function CAM operates analogously, in that the add-then-multiply algorithm 120 results in a ciphertext with a zero (0) in the k-th slot precisely when the query matched the (n(i−1)+k)-th row of dataset D for at least one batch index i.

The only major difference is not wanting to wrap around t during the computation to avoid false positives. The sums of squares of differences in Equation (1) can now be as large as $l_b(b-1)^2$, where $\ell$b is the length of the string when represented in base b. For example, if the rows are $\ell$-bit integers, then $\ell_b = \lceil \ell/\log_2 b \rceil$. Once again, since t is a prime, the product is not a concern. For example, consider bit strings of length one-hundred (100). In the binary representation, it would suffice to take t>100, but in base-16, it would be t>5625. Roughly estimating, this increase in t can result in the ciphertext noise growing by six (6) extra bits in each multiplication, amounting to a total of $6(1+\lceil\log_2 B\rceil)$ bits more noise in the result, potentially prompting an increase in the encryption parameters when B is large. Nevertheless, the number of squarings is reduced by a factor of four (4), so as long as the parameters do not need to be increased (or minimally), the result can be a significant improvement in performance. The CAM method is very efficient when the bit strings are long, and the B batch count is not too large. The possibility of using a larger base for encoding the strings can help further reduce their length, and increase the performance. The CAM method is also fully compatible with all of the performance improvements described below further with reference to hashing, making it even more efficient.

Multiply-then-Add

The string matching application 112 implements the multiply-then-add algorithm 118, also referred to herein as compare-multiply-add (CMA). This technique can be used for scenarios where the strings are short, and there are many of them (small $\ell$, large N). The multiply-then-add algorithm 118 homomorphically evaluates the function noted as Equation(2):

$$CMA(\overline{D}_{Enc}, \overline{X}_{Enc}) = \prod_{i=1}^{B} \prod_{j=1}^{\ell} \left[1 - \left((\overline{D}_{Enc}^{(i)})_j - (\overline{X}_{Enc})_j\right)^2\right]$$

Due to batching, in Equation(2), each subtraction followed by squaring compares n bits (one bit per one row in the original dataset D) to the corresponding bit position in the query string X Since the result is subtracted from one (1), a match is indicated by a resulting value of one (1) rather than by a value zero (0), as was the case in the CAM method.

As the comparison results of different bits are multiplied together, a match of the entire string is indicated by a one (1) (after the multiplication over the index j), and a mismatch by a zero (0). Summing over the batch index i results in a ciphertext with a positive entry in the k-th slot if the k-th row within the i-th batch for some i, (i.e., the (n(i−1)+k)-th row in D), matches the query string X. Otherwise the value at the k-th slot will be zero (0). Moreover, the number in the k-th slot will be precisely the sum of matches found in the k-th slot of all batches, and the sum of the values in all slots will be precisely the number of matches found.

Evaluating the function CMA requires $(\ell+1)B-1$ additions or subtractions, $\ell$B squarings, and $(\ell-1)$B multiplications. It has multiplicative depth $(1+\lceil\log_2 \ell\rceil)$, which is small when $\ell$ is small, but does not depend on N. Since the expression in the square brackets in Equation(2) always has a value either zero (0) or one (1), the only restriction on t is that t>B to prevent modular reduction in the summation phase (as compare to the bound t>$\ell$ in the CAM method).

The CMA method is effective when $\ell$ (i.e., the length of the strings) is short. In this case the multiplicative depth does not depend on the number of rows in the dataset, which makes this method particularly suitable for situations where level $(1+\lceil\log_2 \ell\rceil)$ circuits can be computed with reasonable parameters. However, the computational complexity and the multiplicative depth quickly become very high when f grows. Another significant advantage of the CMA approach is that the signal of success comes in a much more useful form than in the CAM approach. For example, in the case of only one batch, if a match is found, the result of CMA is a ciphertext with a one (1) exactly in the slot(s) where the match occurred, and zero (0) elsewhere. Thus, the result of CMA can be used to perform conditional computations depending on whether a match was found or not. Furthermore, CMA always shows the exact number of matches that were found, which may not always be true for CAM, but will be when the features of hashing are implemented.

Hashing

The string matching application 112 implements the hashing algorithm 126, such as permutation-based cuckoo hashing that can be used in various ways to improve the performance of the string matching algorithms. The hashing algorithm can be used to shorten the strings that need to be homomorphically compared, resulting in overall better performance with the CAM function of the add-then-multiply algorithm 120 and with the CMA function of the multiply-then-add algorithm 118. Additionally, the hashing algorithm allows function CAM to always return the exact number of matches found. Further, when using the function CAM of the multiply-then-add algorithm 118, several queries can be packed together into multi-queries, resulting in significantly improved amortized performance in both query size and processing time.

Permutation-based hashing is a technique used to improve the efficiency of Private Set Intersection (PSI) protocols, where two distrusting parties both hold sets of bit strings, and want to find the intersection of their respective sets without revealing anything else to the other about their sets. Permutation-based hashing can be used to shorten the strings that need to be compared in these protocols, resulting in improved performance. For example, X can be an $\ell$-bit string, and can be split into two parts as $X=X_L\|X_R$ where $\ell$L is the bit-length of $X_L$, and $\ell_R$ is the bit-length of $X_R$. Further, $$H: \{0, 1\}^{\ell_L} \to \{0, 1\}^{\ell_R}$$

is a hash function and the location of X is defined as: $Loc(X) = H(X_L) \oplus X_R$. A hash table then has n bins, where $n = 2^{\ell_R}$, and $X_L$ is inserted in the bin with index $Loc(X)$.

Two different strings will never yield the same value in the same bin, because $Loc(X) = Loc(Y)$ (same bin) together with $X_L = Y_L$ (same value) imply immediately that $X = Y$. In some sense, permutation-based cuckoo hashing encodes a part of the string into the index of the bin (location in the hash table). If bin comparisons are free or de minimis, the amount of work that needs to be done in actual string comparison operations may be significantly reduced. The setting is such that each bin contains at most one item, which depending on the hash function H, the total number of strings, and the hash table size n, this may or may not be likely to happen. Nevertheless, this technique allows use of cuckoo hashing, as a hashing technique with a particularly high load factor.

In the above description of permutation-based hashing an assumption is that each bin will end up containing at most one value. This can be achieved by taking the table to be much larger than the number of possible strings to be inserted, but this is also wasteful. Instead, permutation-based cuckoo hashing can be implemented, which uses several hash functions to try to find a hashing scheme that gives as small of a hash table as possible, while ensuring that each bin ends up with at most one item.

Given n to be the size of the hash table as described above with having N items to be inserted, and $H_1$ and $H_2$ are independent and random hash functions $$\{0, 1\}^{\ell_L} \to \{0, 1\}^{\ell_R},$$

then denote: $Loc_i(X) = H_i(X_L) \oplus X_R$, where $X_L$ and $X_R$ are as above. The N items are inserted into the table as follows: Given an item X, insert $X_L$ at $Loc_1(X)$. If this location was already occupied by $X'_L$ for some other item X' with $Loc_1(X') = Loc_1(X)$, then pop $X'_L$ and insert it at $Loc_{1-i}(X')$. This continues until the conflict is resolved, and until all items are inserted. Although this method may fail due to an infinite loop of insertions occurring, it will succeed as long as $n \geq 2N$. When using more than one hash function in permutation-based hashing, it is possible that two distinct items hash to the same value in the same bin, breaking the property that the location and the hash value uniquely describe the item. This can be addressed in a number of ways, such as by appending the index of the hash function to the string stored in the bin, or to the bin index. For example, to append it to the bin index, the size of the hash table is taken to be $n = 2^{\ell_R+1}$, and set $Loc_i(X) = i \cdot 2^{\ell_R} + [H_i(X_L) \oplus X_R]$.

The space-efficiency of cuckoo hashing can be significantly improved by using more hash functions. The generalization is called d-cuckoo hashing, and consider d independent and random hash functions $$H_1, \ldots, H_d: \{0, 1\}^{\ell_L} \to \{0, 1\}^{\ell_R}$$

and denote $Loc_i(X) = (i-1) \cdot 2^{\ell_R} + [H_i(X_L) \oplus X_R]$. The N items are inserted into a hash table of size $n = 2^{\ell_R + \lceil \log_2 d \rceil}$ using the random-walk method as follows: To insert an item X, choose a random hash function index i, and insert $X_L$ at $Loc_i(X)$. If the location was already occupied by $X'_L$ for some other item X' with $Loc_i(X') = Loc_i(X)$, then pop $X'_L$, randomly choose another hash function index $j \neq i$, and insert $X'_L$ at $Loc_j(X')$. This can continue until the conflict is resolved, and until all items are inserted into the hash table.

For improved exact string matching, a single batch dataset is noted as dataset D as described above, and the total number of rows is $N < n$ so that the batch count $B = 1$. Instead of working with D directly, each row $Q^{(1)}, \ldots, Q^{(N)}$ can be hashed using the permutation-based d-cuckoo hashing to produce a hashed dataset H(D). The length of the rows $Q^{(i)}$ is $\ell = \ell_R + \ell_L$, and $n = 2^{\ell_R + \lceil \log_2 d \rceil}$. Assuming that N is so much smaller than n, the hashing succeeds with overwhelming probability. Let $\overline{H(D)}$ denote the batching of the hashed dataset, analogous to $\overline{D}$ as described above with reference to encrypting the dataset, and $\overline{H(D)_{Enc}}$ denotes its encryption.

Given a query string X of length $\ell$, permutation-based d-cuckoo hashing is applied to form a hashed query. In this case, only one item (namely X) is hashed into a table of size n, and each of the d locations $Loc_i(X)$ with $X_L$ are populated. This is necessary due to not knowing into which of the d locations X eventually ended up when the dataset was hashed. The hash table containing the hashed query string is denoted as H(X). Each row of the hash table will have length $\ell_L$ bits, and the Compose function is applied to form the batching of the hashed query $\overline{H(X)}$, and finally encrypt it to obtain $\overline{H(X)_{Enc}}$.

The comparison of $\overline{H(X)_{Enc}}$ with $\overline{H(D)_{Enc}}$ can be performed by the string matching application 112 using the add-then-multiply algorithm 120 to implement the function CAM, or using the multiply-then-add algorithm 118 to implement the function CMA. The strings that need to be compared have length $\ell_L$ bits, which is $\ell_R = \log_2 n - \lceil \log_2 d \rceil$ bits fewer than the original $\ell$ bits. In an optimal case, d is as small as possible, and n is as large as possible. However, in practice, n is bounded by performance restrictions coming from homomorphic encryption (bigger n means worse performance). For example, sizes for n may be between 1024 and approximately 65536, and d is typically 3, 4, or at most 5.

For multiple batch dataset, when the total number of items N is very large, it is not realistic to take n to be such that $N < n$, as this results in poor performance for homomorphic encryption. Instead, the dataset can be broken into several (vertical) batches, each containing N' elements, where N'|N, such that $N' < n$. The d-cuckoo hashing can then be used to hash each of the $B = N/N'$ batches of items into B separate hash tables of size n. As long as N' is small enough, and d large enough, the probability of d-cuckoo hashing succeeding for each of the B hash tables is good. The same set of hash functions are used for each of the hash tables, and this technique works with both functions CAM and CMA. The algorithm can assume that the size N of the dataset, and the length $\ell$ of the strings, are public information, and for security, a public predetermined bound for B is fixed.

For larger base, the CAM method uses larger base $b > 2$ for more compact representation of the strings, and for better message expansion in encryption. The dataset and query are hashed as described above, but the items in the bins that earlier were expressed as bit strings of length $\ell_L$ are now instead expressed as base-b strings of length $\ell_{L,b} = \lceil \ell_L / \log_2 b \rceil$. The issue of empty bins has been ignored until now. The hash tables in the hashed dataset will typically contain some number of empty bins, and the hashed queries (which are also hash tables) will contain almost entirely empty bins. An empty bin naturally results in a value of zero (0) in the corresponding slot after batching. These zeros will cause matches to occur, unless they are in some way invalidated.

This issue is easy to solve by writing an impossible value to the slots that correspond to empty bins in the batched hashed query and dataset. Note that these impossible values are different for the query, and for the dataset. Note that when using a base b in decomposing the strings, after batching the values in the slots will be at most b−1. For the CAM method, the empty bins of the hashed dataset are populated with the value b, and the empty bins of the hashed query are populated with the value b+1. As described above, the CAM method works as long as the homomorphic encryption parameter $t > \ell_{L,b}(b+1)^2$. A slightly better result can be obtained by invalidating the unused bins for one of the $\ell_L$ positions, and require t to be such that $(\ell_{L,b}-1)(b-1)^2 + (b+1)^2 < t$.

For the CMA method, the issue is handled differently. For example, given the batch count is B, then the party that encrypts the dataset includes with it B additional ciphertexts that contain masks for the batches, invalidating (i.e., setting to zero) all locations that are empty in the hash table. Similarly, the party that submits the query includes an extra ciphertext that encrypts a mask that invalidates all locations that are empty in the query hash table. So instead of the usual CMA, the algorithm evaluates:

$$CMA(\overline{H(D)}_{Enc}, \overline{H(X)}_{Enc}) = \text{Mask }(H(X))$$

$$\sum_{i=1}^{B} \left\{ \text{Mask }(H(D))_i \cdot \prod_{j=1}^{\ell} \left[ 1 - \left( (\overline{H(D^{(i)})}_{Enc})_j - (\overline{H(X)_{Enc}})_j \right)^2 \right] \right\}$$

where Mask(H(D))$_i$ is a batched ciphertext that has a one (1) in each slot that corresponds to a non-zero hash table bin in H(D$^{(i)}$), and a zero (0) in the rest of the slots, as well as Mask(H(X)) is a batched ciphertext that has a one (1) in the slots that correspond to non-empty bins, and a zero (0) in other slots. The masks will now automatically invalidate all rows that are not supposed to be included in the comparison by setting them to zero.

Multi-Queries

The string matching application 112 implements the multi-queries algorithm 128, and can be utilized to submit multiple k queries $X^{(1)}, \ldots, X^{(k)}$ against the dataset that has been hashed and encrypted. Naively, the performance and communication cost is k-fold improved compared to submitting a single query. Alternatively, the algorithm may use the same hash table when hashing each of the k queries, reducing the performance to (1/k)-th of that of the naive approach. This performs as long as for each of the d location functions, the locations Loc($X^{(j)}$) are distinct. In case there is overlap in the locations, the multi-query is split into two or more parts. For example, if $B_X$ denotes the size of the largest bin after inserting all k items with all d hash functions, then the multi-query is broken up into $B_X$ hash tables, each of which will be batched and encrypted separately.

Considering success probability, the number of k concurrent queries (k-multi-queries) are assumed to be public information, and for security, the algorithm can predetermine a value for $B_X$ that is exceeded with probability at most $2^{-\lambda}$, where $\lambda$ is the statistical security parameter. Then $B_X$ is submitted as separate queries, because otherwise someone observing the queries would be able to determine whether hash collisions occurred more or less than expected, which possibly leaks information. Distinct location functions are constructed to map values to non-overlapping regions in the hash table, and each such region has a size n/d. As an illustrative example using balls and boxes, first determine how likely is it that when placing k balls into n/d boxes, the largest box has a size at most $B_X$:

$Pr$[at least one box contains more than $B_X$ balls] $\leq$ $$\frac{n}{d} \cdot Pr[\text{first box contains more than } B_X \text{ balls}] = $$

$$\frac{n}{d} \sum_{i=B_X+1}^{k} \binom{k}{i}\left(\frac{d}{n}\right)^i \left(1 - \frac{d}{n}\right)^{k-i}$$

To fail, this would occur in at least one of the d regions. Therefore, $$Pr[\text{multiquery packing failure}] \leq n \sum_{i=B_X+1}^{k} \binom{k}{i}\left(\frac{d}{n}\right)^i \left(1 - \frac{d}{n}\right)^{k-i}$$

Furthermore, if more than one multi-query is performed over the lifetime of the data, the success probability can be adjusted to ensure that the failure probability is negligible even when performing some predetermined number M of k-multi-queries. For example, $B_X$ can be selected in such a way that on expectation at most one of every $2^\lambda M$ k-multi-queries fails, however for simplicity, can assume M=1. It is also possible to ignore this information leak, and simply submit a k-multi-query in as few batches as possible. Any resulting information leak would be very difficult to use if compromised, particularly without knowing the hash functions used by the location functions. Nevertheless, for security, the number $B_X$ is determined beforehand, and the multi-query size does not depend on the individual query strings themselves.

As shown and described with reference to FIG. 2, two parties are considered as the server that stores the encrypted dataset and evaluates the string matching function CAM. The client who owns and encrypts the dataset submits encrypted queries to the server, owns the secret key, and obtains the results of the queries. The protocol can be easily extended to work instead with a dataset owner who is different from the client, and uses only the client's public key to encrypt its dataset. The protocol would be nearly identical, except that the server would randomize the non-zero slots in the output of the function CAM so as to not leak extra information about the dataset to the client.

Example methods 300, 400, and 500 are described with reference to respective FIGS. 3-5 in accordance with one or more aspects of string matching in encrypted data. Generally, any of the components, modules, methods, and operations described herein can be implemented using software, firmware, hardware (e.g., fixed logic circuitry), manual processing, or any combination thereof. Some operations of the example methods may be described in the general context of executable instructions stored on computer-readable storage memory that is local and/or remote to a computer processing system, and implementations can include software applications, programs, functions, and the like. Alternatively or in addition, any of the functionality described herein can be performed, at least in part, by one or more hardware logic components, such as, and without limitation, Field-programmable Gate Arrays (FPGAs), Application-specific Integrated Circuits (ASICs), Application-specific Standard Products (ASSPs), System-on-a-chip systems (SoCs), Complex Programmable Logic Devices (CPLDs), and the like.

Figure 3:
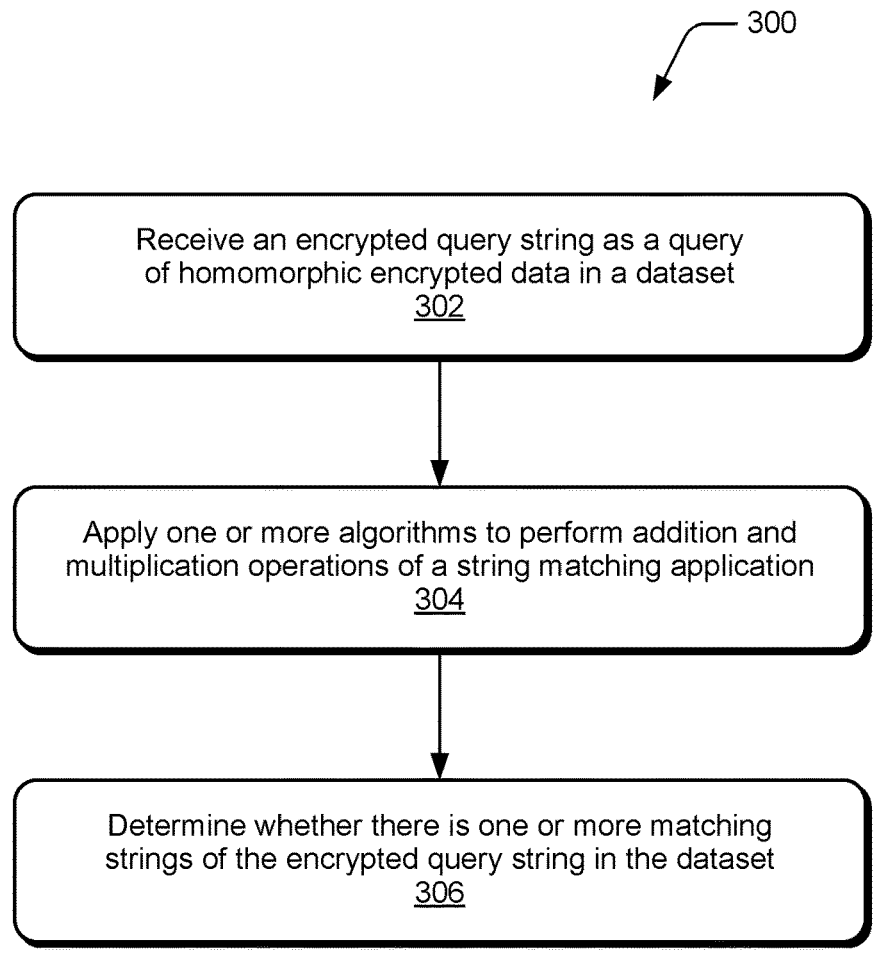
FIG. 3 illustrates an example method of string matching in encrypted data in accordance with techniques described herein.

FIG. 3 illustrates an example method 300 of string matching in encrypted data, and is generally described with reference to the string matching application implemented by a computing device and/or server device. The order in which the method is described is not intended to be construed as a limitation, and any number or combination of the method operations can be performed in any order to implement a method, or an alternate method.

At 302, an encrypted query string is received as a query of homomorphic encrypted data in a dataset. For example, the string matching application 112 that is implemented by the computing device 100 receives the encrypted query string 108 as a query of the homomorphic encrypted data in the dataset 106. Similarly, the string matching application 112 that is implemented by the cloud-based service 202 receives the encrypted query string 108 as a query of the homomorphic encrypted data in the dataset 106.

At 304, one or more algorithms are applied to perform addition and multiplication operations of a string matching application. For example, the string matching application 112 that is implemented by the computing device 100 applies one or more of the various algorithms to perform the addition and multiplication operations. The multiply-then-add algorithm 118 of the string matching application 112 computes, for each row of the dataset 106, a product over some function of dataset bits and query bits for a row result, and then adds the respective row results of the computed rows to determine a total number of the matching data strings 114. Alternatively, the add-then-multiply algorithm 120 of the string matching application 112 computes, for each row of the dataset 106, a sum of some function of dataset bits and query bits for a row result, and then multiplies the respective row results of the computed rows to determine the matching data strings 114. Similarly, the string matching application 112 that is implemented by the cloud-based service 202 applies one or more of the various algorithms to perform the addition and multiplication operations.

At 306, one or more matching strings of the encrypted query string are determined in the dataset. For example, the string matching application 112 that is implemented by the computing device 100 determines whether there are the matching data strings 114 of the encrypted query string 108 in the dataset 106, where the matching data strings 114 are the output 116 of the string matching application. Similarly, the string matching application 112 that is implemented by the cloud-based service 202 determines whether there are the matching data strings 114 of the encrypted query string 108 in the dataset 106, and returns the matching data strings 114 to the computing device 100 as the returned matching strings 206.

Figure 4:
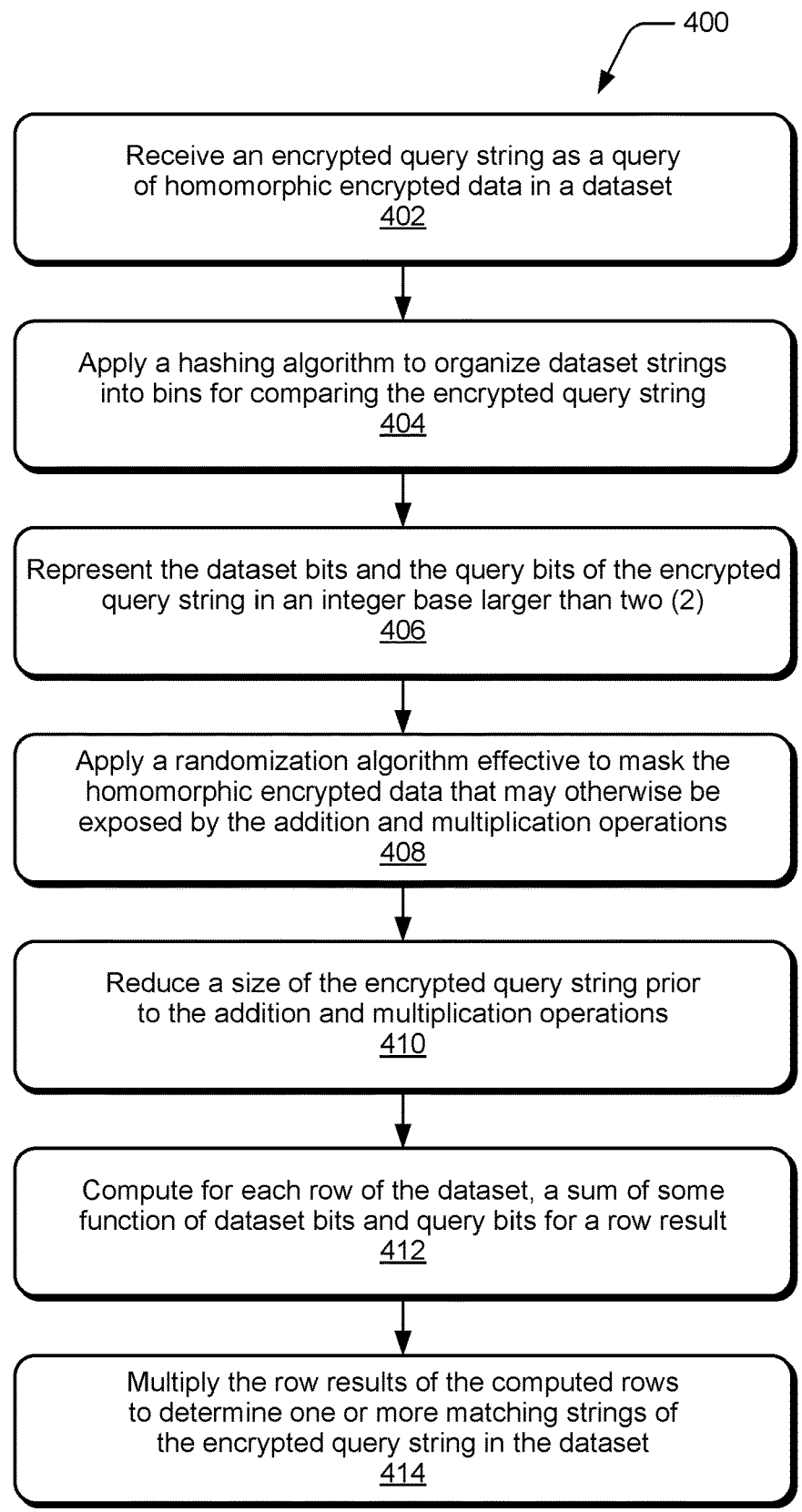
FIG. 4 illustrates an example method of string matching in encrypted data in accordance with techniques described herein.

FIG. 4 illustrates an example method 400 of string matching in encrypted data, and is generally described with reference to the string matching application and the add-then-multiply technique implemented by a computing device and/or server device. The order in which the method is described is not intended to be construed as a limitation, and any number or combination of the method operations can be performed in any order to implement a method, or an alternate method.

At 402, an encrypted query string is received as a query of homomorphic encrypted data in a dataset. For example, the string matching application 112 that is implemented by the computing device 100 and/or by the cloud-based service 202 receives the encrypted query string 108 as a query of the homomorphic encrypted data in the dataset 106. Similarly, the string matching application 112 that is implemented by the cloud-based service 202 receives the encrypted query string 108 as a query of the homomorphic encrypted data in the dataset 106. In implementations, the string matching application 112 applies the multi-queries algorithm 128 and queries the dataset 106 of the homomorphic encrypted data for multiple encrypted query strings 108, and multiple matching data strings 114 of the multiple encrypted query strings 108 in the dataset 106 can be determined. Additionally, the string matching application 112 can apply the Galois unpacking algorithm 130 to initiate multiple encrypted query strings 108 in a single ciphertext.

At 404, a hashing algorithm is applied to organize dataset strings into bins for comparing the encrypted query string. For example, the string matching application 112 that is implemented by the computing device 100 and/or by the cloud-based service 202 applies the hashing algorithm 126, organizing the homomorphic encrypted data bits of the dataset 106 into bins for comparison with the encrypted query string 108, such as prior to the addition and multiplication operations implemented by the add-then-multiply algorithm 120 and/or the multiply-then-add algorithm 118.

At 406, the dataset bits and the query bits of the encrypted query string are represented in an integer base larger than two (2). For example, the string matching application 112 that is implemented by the computing device 100 and/or by the cloud-based service 202 applies the base representation algorithm 122 to represent the homomorphic encrypted data bits of the dataset 106 and the query bits of the encrypted query string 108 in an integer base larger than two (2). A larger base improves the query size of the encrypted query string 108, and is an efficiency implemented by the add-then-multiply algorithm 120 to compare larger numbers than simply single bits of the dataset 106 and the query bits in the encrypted query string 108.

At 408, a randomization algorithm is applied effective to mask the homomorphic encrypted data that may otherwise be exposed by the addition and multiplication operations. For example, the string matching application 112 that is implemented by the computing device 100 and/or by the cloud-based service 202 applies the randomization algorithm 124 effective to mask the homomorphic encrypted data that may otherwise be exposed by the addition and multiplication operations implemented by the add-then-multiply algorithm 120. The randomization algorithm 124 of the string matching application 112 implements the randomization technique that masks the extra information of the homomorphic encrypted data that may be exposed in a cryptographically secure way.

At 410, a size of the encrypted query string is reduced prior to the addition and multiplication operations that provide one or more matching strings of the encrypted query string in the dataset. For example, the string matching application 112 that is implemented by the computing device 100 and/or by the cloud-based service 202 applies the multi-queries algorithm 128 to simultaneously query the dataset 106 of the homomorphic encrypted data for multiple encrypted query strings 108, and thus determine multiple matching data strings 114 of the multiple encrypted query strings in the dataset.

At 412, for each row of the dataset, a sum of some function of dataset bits and query bits is computed for a row result and, at 414, the row results of the computed rows are multiplied to determine one or more matching strings of the encrypted query string in the dataset. For example, the string matching application 112 that is implemented by the computing device 100 and/or by the cloud-based service 202 implements the add-then-multiply algorithm 120 to compute, for each row of the homomorphic encrypted data bits in the dataset 106, a sum of some function of dataset bits and query bits for a row result. The add-then-multiply algorithm 120 then multiplies the respective row results of the computed rows to determine the matching data strings 114.

Figure 5:
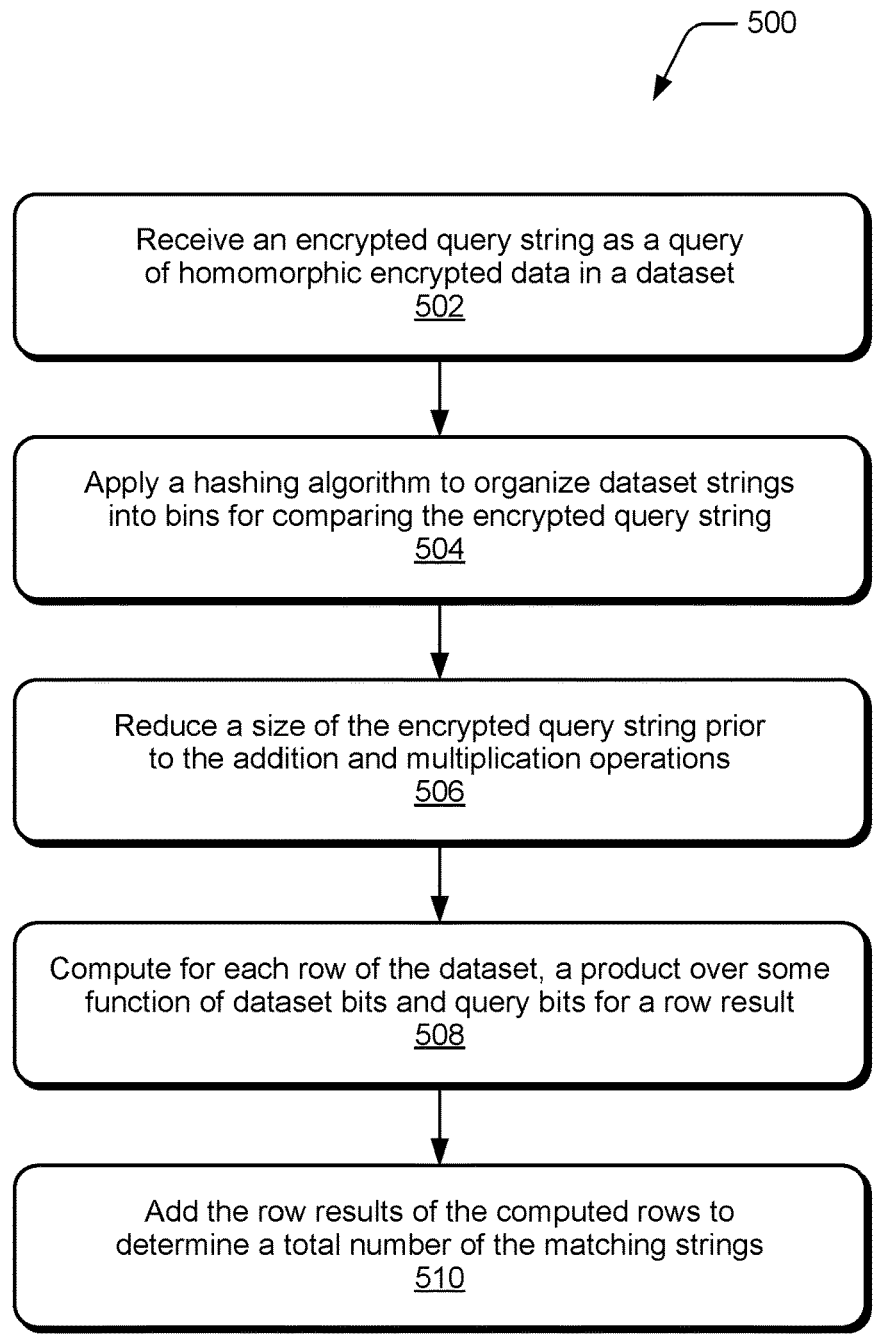
FIG. 5 illustrates an example method of string matching in encrypted data in accordance with techniques described herein.

FIG. 5 illustrates an example method 500 of string matching in encrypted data, and is generally described with reference to the string matching application and the multiply-then-add technique implemented by a computing device and/or server device. The order in which the method is described is not intended to be construed as a limitation, and any number or combination of the method operations can be performed in any order to implement a method, or an alternate method.

At 502, an encrypted query string is received as a query of homomorphic encrypted data in a dataset. For example, the string matching application 112 that is implemented by the computing device 100 and/or by the cloud-based service 202 receives the encrypted query string 108 as a query of the homomorphic encrypted data in the dataset 106. Similarly, the string matching application 112 that is implemented by the cloud-based service 202 receives the encrypted query string 108 as a query of the homomorphic encrypted data in the dataset 106. In implementations, the string matching application 112 applies the multi-queries algorithm 128 and queries the dataset 106 of the homomorphic encrypted data for multiple encrypted query strings 108, and multiple matching data strings 114 of the multiple encrypted query strings 108 in the dataset 106 can be determined. Additionally, the string matching application 112 can apply the Galois unpacking algorithm 130 to initiate multiple encrypted query strings 108 in a single ciphertext.

At 504, a hashing algorithm is applied to organize dataset strings into bins for comparing the encrypted query string. For example, the string matching application 112 that is implemented by the computing device 100 and/or by the cloud-based service 202 applies the hashing algorithm 126, organizing the homomorphic encrypted data bits of the dataset 106 into bins for comparison with the encrypted query string 108, such as prior to the addition and multiplication operations implemented by the add-then-multiply algorithm 120 and/or the multiply-then-add algorithm 118.

At 506, a size of the encrypted query string is reduced prior to the addition and multiplication operations that provide one or more matching strings of the encrypted query string in the dataset. For example, the string matching application 112 that is implemented by the computing device 100 and/or by the cloud-based service 202 applies the multi-queries algorithm 128 to simultaneously query the dataset 106 of the homomorphic encrypted data for multiple encrypted query strings 108, and thus determine multiple matching data strings 114 of the multiple encrypted query strings in the dataset.

At 508, for each row of the dataset, a product over some function of dataset bits and query bits is computed for a row result, and at 510, the row results of the computed rows are added to determine a total number of the one or more matching strings. For example, the string matching application 112 that is implemented by the computing device 100 and/or by the cloud-based service 202 applies the multiply-then-add algorithm 118 to compute, for each row of the dataset 106, a product over some function of dataset bits and query bits for a row result. The multiply-then-add algorithm 118 then adds the respective row results of the computed rows to determine a total number of the matching data strings 114.

Figure 6:
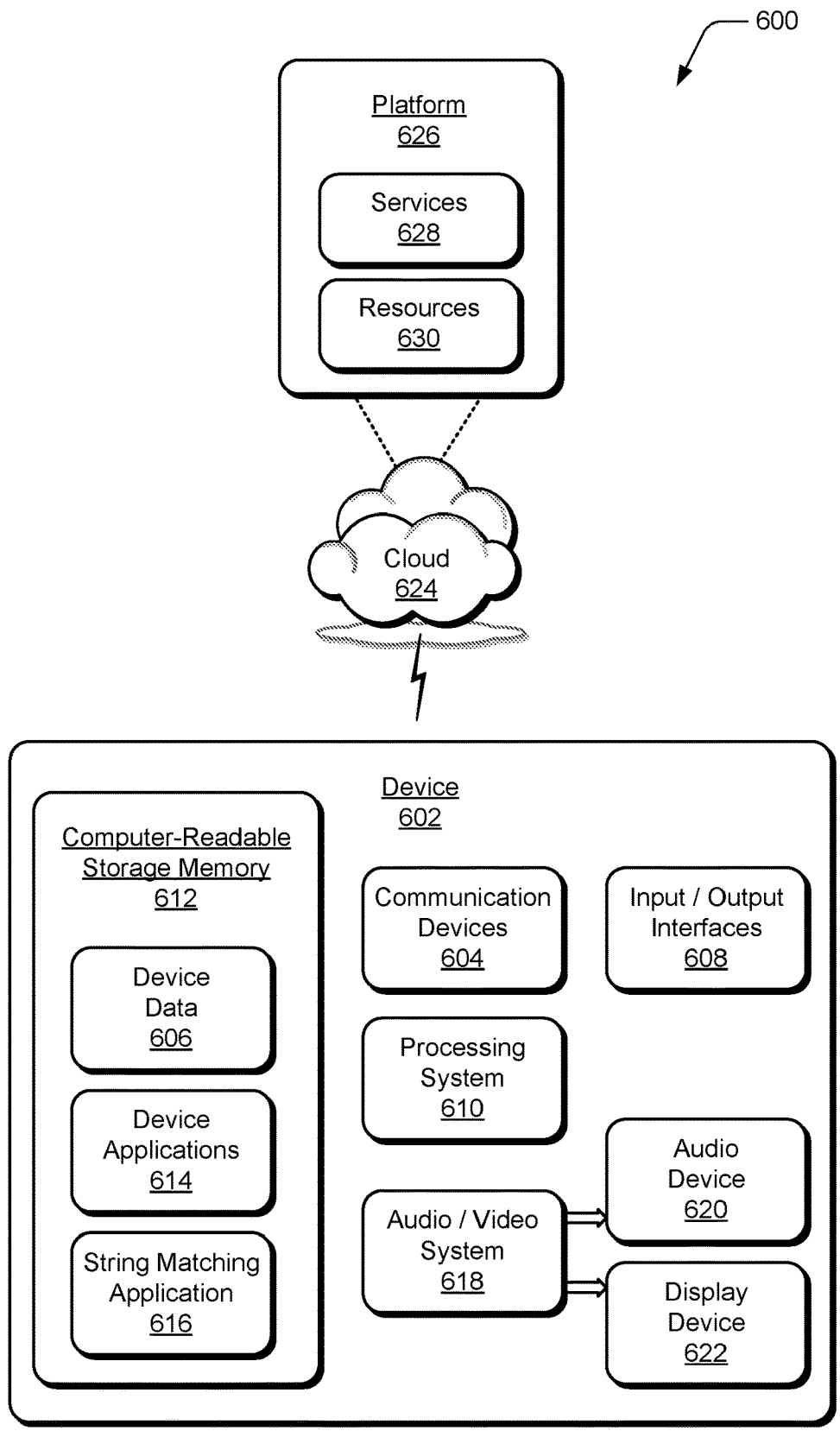
FIG. 6 illustrates an example system with an example device that can implement string matching in encrypted data as described herein.

FIG. 6 illustrates an example system 600 that includes an example device 602, which can implement aspects of string matching in encrypted data. The example device 602 can be implemented as any of the computing devices, user devices, and server devices described with reference to the previous FIGS. 1-5, such as any type of mobile device, wearable device, client device, mobile phone, tablet, computing, communication, entertainment, gaming, media playback, and/or other type of device. For example, the computing device and server device described herein may be implemented as the example device 602 or with various components of the example device.

The device 602 includes communication devices 604 that enable wired and/or wireless communication of device data 606, such as homomorphic encrypted data, encrypted query strings, dataset bits of the homomorphic encrypted data, query bits of an encrypted query string, and any other type of data related to homomorphic encrypted data and queries. Additionally, the device data can include any type of audio, video, and/or image data. The communication devices 604 can also include transceivers for cellular phone communication and for network data communication.

The device 602 also includes input/output (I/O) interfaces 608, such as data network interfaces that provide connection and/or communication links between the device, data networks, and other devices described herein. The I/O interfaces can be used to couple the device to any type of components, peripherals, and/or accessory devices. The I/O interfaces also include data input ports via which any type of data, media content, and/or inputs can be received, such as user inputs to the device, as well as any type of audio, video, and/or image data received from any content and/or data source.

The device 602 includes a processing system 610 that may be implemented at least partially in hardware, such as with any type of microprocessors, controllers, and the like that process executable instructions. The processing system can include components of an integrated circuit, programmable logic device, a logic device formed using one or more semiconductors, and other implementations in silicon and/or hardware, such as a processor and memory system implemented as a system-on-chip (SoC). Alternatively or in addition, the device can be implemented with any one or combination of software, hardware, firmware, or fixed logic circuitry that may be implemented with processing and control circuits. The device 602 may further include any type of a system bus or other data and command transfer system that couples the various components within the device. A system bus can include any one or combination of different bus structures and architectures, as well as control and data lines.

The device 602 also includes a computer-readable storage memory 612, such as data storage devices that can be accessed by a computing device, and that provide persistent storage of data and executable instructions (e.g., software applications, programs, functions, and the like). Examples of the computer-readable storage memory 612 include volatile memory and non-volatile memory, fixed and removable media devices, and any suitable memory device or electronic data storage that maintains data for computing device access. The computer-readable storage memory can include various implementations of random access memory (RAM) (e.g., the DRAM and battery-backed RAM), read-only memory (ROM), flash memory, and other types of storage media in various memory device configurations.

The computer-readable storage memory 612 provides storage of the device data 606 and various device applications 614, such as an operating system that is maintained as a software application with the computer-readable storage memory and executed by the processing system 610. In this example, the device applications include a string matching application 616 that implements the features and techniques of string matching in encrypted data, such as when the example device 602 is implemented as the computing device 100 and/or as a server device of the cloud-based service 202 described herein with reference to FIGS. 1-5. Examples of the string matching application 616 include the string matching application 112 implemented by the computing device 100 as described with reference to FIG. 1, and the string matching application 112 implemented by a server device of the cloud-based service 202 as described with reference to FIG. 2.

The device 602 also includes an audio and/or video system 618 that generates audio data for an audio device 620 and/or generates display data for a display device 622. The audio device and/or the display device include any devices that process, display, and/or otherwise render audio, video, display, and/or image data. In implementations, the audio device and/or the display device are integrated components of the example device 602. Alternatively, the audio device and/or the display device are external, peripheral components to the example device.

In aspects of string matching in encrypted data, at least part of the techniques described herein may be implemented in a distributed system, such as over a "cloud" 624 in a platform 626. The cloud 624 includes and/or is representative of the platform 626 for services 628 and/or resources 630. The platform 626 abstracts underlying functionality of hardware, such as server devices (e.g., included in the services 628) and/or software resources (e.g., included as the resources 630), and connects the example device 602 with other devices, servers, etc. The resources 630 may also include applications and/or data that can be utilized while computer processing is executed on servers that are remote from the example device 602. Additionally, the services 628 and/or the resources 630 may facilitate subscriber network services, such as over the Internet, a cellular network, or Wi-Fi network. The platform 626 may also serve to abstract and scale resources to service a demand for the resources 630 that are implemented via the platform, such as in an interconnected device embodiment with functionality distributed throughout the system 600. For example, the functionality may be implemented in part at the example device 602 as well as via the platform 626 that abstracts the functionality of the cloud.

Although aspects of string matching in encrypted data have been described in language specific to features and/or methods, the appended claims are not necessarily limited to the specific features or methods described. Rather, the specific features and methods are disclosed as example implementations of string matching in encrypted data, and other equivalent features and methods are intended to be within the scope of the appended claims. Further, various different embodiments are described and it is to be appreciated that each described embodiment can be implemented independently or in connection with one or more other described embodiments. Additional aspects of the techniques, features, and/or methods discussed herein relate to one or more of the following:

A computing device implemented for string matching in encrypted data, the computing device comprising: a memory configured to store homomorphic encrypted data as a dataset; a processor system configured to execute a string matching application that is implemented to: receive an encrypted query string as a query of the homomorphic encrypted data; apply one or more algorithms to perform addition and multiplication operations of the string matching application; and determine whether there is one or more matching strings of the encrypted query string in the dataset.

Alternatively or in addition to the above described computing device, any one or combination of: the string matching application is implemented to: compute for each row of the dataset, a product over some function of dataset bits and query bits for a row result; and add the row results of the computed rows to determine a total number of the one or more matching strings. The string matching application is implemented to: compute for each row of the dataset, a sum of some function of dataset bits and query bits for a row result; and multiply the row results of the computed rows to determine the one or more matching strings. The string matching application is implemented to represent the dataset bits and the query bits of the encrypted query string in an integer base larger than two (2). The string matching application is implemented to apply a randomization algorithm effective to mask the homomorphic encrypted data that may otherwise be exposed by the computed sum and the multiply operations. The string matching application is implemented to: simultaneously query the dataset of the homomorphic encrypted data for multiple encrypted query strings; and determine multiple matching strings of the multiple encrypted query strings in the dataset. The string matching application is implemented to reduce a size of the encrypted query string prior to the addition and multiplication operations that provide the one or more matching strings of the encrypted query string in the dataset. The string matching application is implemented to apply a hashing algorithm to organize dataset strings into bins for comparing the encrypted query string prior to the addition and multiplication operations. The string matching application is implemented to apply a Galois unpacking algorithm to initiate multiple encrypted query strings in a single ciphertext.

A method for string matching in encrypted data, the method comprising: receiving an encrypted query string as a query of homomorphic encrypted data in a dataset; applying one or more algorithms to perform addition and multiplication operations of a string matching application; and determining whether there is one or more matching strings of the encrypted query string in the dataset.

Alternatively or in addition to the above described method, any one or combination of: computing for each row of the dataset, a product over some function of dataset bits and query bits for a row result; and adding the row results of the computed rows to determine a total number of the one or more matching strings. The method further comprising computing for each row of the dataset, a sum of some function of dataset bits and query bits for a row result; and multiplying the row results of the computed rows to determine the one or more matching strings. The method further comprising representing the dataset bits and the query bits of the encrypted query string in an integer base larger than two (2). The method further comprising applying a randomization algorithm effective to mask the homomorphic encrypted data that may otherwise be exposed by the computing the sum and the multiplying operations. The method further comprising querying the dataset of the homomorphic encrypted data for multiple encrypted query strings; and determining multiple matching strings of the multiple encrypted query strings in the dataset. The method further comprising reducing a size of the encrypted query string prior to the addition and multiplication operations that provide the one or more matching strings of the encrypted query string in the dataset. The method further comprising applying a hashing algorithm to organize dataset strings into bins for comparing the encrypted query string prior to the addition and multiplication operations. The method further comprising applying a Galois unpacking algorithm to initiate multiple encrypted query strings in a single ciphertext.

A method for string matching in encrypted data, the method comprising: receiving an encrypted query string as a query of homomorphic encrypted data in a dataset; applying one or more algorithms to perform query operations of a string matching application, the query operations including: computing for each row of the dataset, a sum of some function of dataset bits and query bits for a row result; and multiplying the row results of the computed rows to determine one or more matching strings of the encrypted query string in the dataset.

Alternatively or in addition to the above described method, any one or combination of: applying a hashing algorithm to organize dataset strings into bins for comparing the encrypted query string prior to the computing the sum and the multiplying to determine the one or more matching strings of the encrypted query string in the dataset.

The invention claimed is:

1. A computing device configured to identify matching strings in electronically stored representations of encrypted data, the computing device comprising:
   computer memory configured to store electronically a plurality of encrypted strings as a corresponding plurality of rows of encrypted bits in a dataset, the plurality of encrypted strings being encrypted according to a homomorphic encryption scheme;
   a processor system configured to operate on the electronically stored plurality of encrypted strings to:
      receive an encrypted query string encrypted according to the homomorphic encryption scheme;
      compute, for each of the corresponding plurality of rows of the dataset, a sum of a function of dataset bits and query bits, to obtain a corresponding row result;
      multiply one or more of the corresponding row results to obtain a product; and
      upon determining that the product is zero, return an indication that the encrypted query string matches one or more of the plurality of encrypted strings of the dataset;
      and operate on the electronically stored representations to apply a randomization algorithm effective to mask the homomorphic encrypted data to prevent exposure by the computed sum and the multiply operations.

2. The computing device as recited in claim 1, wherein the processor system is further configured to operate on the electronically stored representations to:
   compute for each row of the dataset, a product over a function of dataset bits and query bits to obtain a row result; and
   add the row results of the computed rows to determine a total number of the one or more matching strings.

3. The computing device as recited in claim 1, wherein the processor system is further configured to operate on the electronically stored representations to represent the dataset bits and the query bits of the encrypted query string in an integer base larger than two (2).

4. The computing device as recited in claim 1, wherein the processor system is further configured to operate on the electronically stored representations to:
   simultaneously query the dataset of the homomorphic encrypted data for multiple encrypted query strings; and
   determine multiple matching strings of the multiple encrypted query strings in the dataset.

5. The computing device as recited in claim 1, wherein the processor system is further configured to operate on the electronically stored representations to reduce a size of the encrypted query string prior to the addition and multiplication operations that provide the one or more matching strings of the encrypted query string in the dataset.

6. The computing device as recited in claim 1, wherein the processor system is further configured to operate on the electronically stored representations to apply a hashing algorithm to organize dataset strings into bins for comparing the encrypted query string prior to the addition and multiplication operations.

7. The computing device as recited in claim 1, wherein the processor system is further configured to operate on the electronically stored representations to apply a Galois unpacking algorithm to initiate multiple encrypted query strings in a single ciphertext.

8. Enacted in a computing device having computer memory operatively coupled to a processor system, a method for identifying matching strings in electronically stored representations of encrypted data, the method comprising:
   storing electronically a plurality of encrypted strings as a corresponding plurality of rows of encrypted bits in a dataset, the plurality of encrypted strings being encrypted according to a homomorphic encryption scheme;
   receiving an encrypted query string encrypted according to the homomorphic encryption scheme;
   representing the dataset bits and query bits of the encrypted query string in an integer base larger than two;
   applying one or more algorithms to perform addition and multiplication operations of a string matching application, wherein the addition and multiplication operations comprise:
      computing for each row of the dataset, a sum of some function of dataset bits and query bits for a row result; and
      multiplying the row results of the computed rows to determine one or more matching strings;
   upon determining that the one or more matching strings of the encrypted query string is present in the dataset,
   returning an indication of the one or more matching strings; and
   applying a randomization algorithm effective to mask the homomorphic encrypted data to prevent exposure by the computing the sum and the multiplying operations.

9. The method as recited in claim 8, further comprising:
computing for each row of the dataset, a product over a function of dataset bits and query bits for a row result; and
adding the row results of the computed rows to determine a total number of the one or more matching strings.

10. The method as recited in claim 8, further comprising:
applying a Galois unpacking algorithm to initiate multiple encrypted query strings in a single ciphertext.

11. The method as recited in claim 8, further comprising:
querying the dataset of the homomorphic encrypted data for multiple encrypted query strings; and
determining multiple matching strings of the multiple encrypted query strings in the dataset.

12. The method as recited in claim 8, further comprising:
reducing a size of the encrypted query string prior to the addition and multiplication operations that provide the one or more matching strings of the encrypted query string in the dataset.

13. The method as recited in claim 8, further comprising:
applying a hashing algorithm to organize dataset strings into bins for comparing the encrypted query string prior to the addition and multiplication operations.

14. Enacted in a computing device having computer memory operatively coupled to a processor system, a method for identifying matching strings in electronically stored representations of encrypted data, the method comprising:

storing electronically a plurality of encrypted strings as a corresponding plurality of rows of encrypted bits in a dataset, the plurality of encrypted strings being encrypted according to a homomorphic encryption scheme;
receiving an encrypted query string encrypted according to the homomorphic encryption scheme;
computing, for each of the corresponding plurality of rows of the dataset, a sum of a function of dataset bits and query bits, to obtain a corresponding a row result;
multiplying one or more of the corresponding row results to obtain a product;
upon determining that the product is zero, returning an indication that the encrypted query string matches one or more of the plurality of encrypted strings of the dataset; and
operating on the electronically stored representations to apply a randomization algorithm effective to mask the homomorphic encrypted data to prevent exposure by the computed sum and the multiply operations.

15. The method as recited in claim 14, further comprising:
applying a hashing algorithm to organize dataset strings into bins for comparing the encrypted query string prior to the computing the sum and the multiplying to determine the one or more matching strings of the encrypted query string in the dataset.

* * * * *